US011985033B2

(12) United States Patent
Dehaine et al.

(10) Patent No.: US 11,985,033 B2
(45) Date of Patent: May 14, 2024

(54) PROPAGATING INFORMATION WITH NETWORK NODES

(71) Applicant: ThreatSTOP, Inc., Carlsbad, CA (US)

(72) Inventors: Nicolas Dehaine, Ramona, CA (US); Paul Mockapetris, Los Altos, CA (US); Daniel Coppock, Evergreen, CO (US); Angelo Ativo, San Diego, CA (US); Alan Chuey, Carlsbad, CA (US); Tomas L. Byrnes, San Marcos, CA (US)

(73) Assignee: ThreatSTOP, Inc., Carlsbad, CA (US)

( * ) Notice: Subject to any disclaimer, the term of this patent is extended or adjusted under 35 U.S.C. 154(b) by 255 days.

(21) Appl. No.: 16/635,958

(22) PCT Filed: Jul. 30, 2018

(86) PCT No.: PCT/US2018/044444
§ 371 (c)(1),
(2) Date: Jan. 31, 2020

(87) PCT Pub. No.: WO2019/027934
PCT Pub. Date: Feb. 7, 2019

(65) Prior Publication Data

US 2020/0244529 A1 Jul. 30, 2020

Related U.S. Application Data

(60) Provisional application No. 62/539,504, filed on Jul. 31, 2017.

(51) Int. Cl.
*H04L 41/0866* (2022.01)
*H04L 41/0806* (2022.01)
(Continued)

(52) U.S. Cl.
CPC ...... *H04L 41/0866* (2013.01); *H04L 41/0806* (2013.01); *H04L 41/082* (2013.01);
(Continued)

(58) Field of Classification Search
CPC ............ H04L 41/0866; H04L 41/0806; H04L 41/082; H04L 61/1511; H04L 67/24; H04L 67/26
(Continued)

(56) References Cited

U.S. PATENT DOCUMENTS 6,012,100 A * 1/2000 Frailong ............... H04L 41/082
709/220
6,654,891 B1 * 11/2003 Borsato .................. H04L 29/06
370/242

(Continued)

OTHER PUBLICATIONS

International Application No. PCT/US2018/044444, Search Report and Written Opinion dated Jan. 3, 2019.

*Primary Examiner* — Cheikh T Ndiaye
*Assistant Examiner* — Ayele F Woldemariam
(74) *Attorney, Agent, or Firm* — Ahmann Kloke LLP

(57) ABSTRACT

A technique for distributing and acquiring information about network devices using the Domain Name System (DNS) is disclosed. Device information, such as configuration settings and system status, is exchanged bi-directionally between one or multiple DNS services and network nodes using the DNS protocol. The information exchanged is encoded as DNS records.

20 Claims, 10 Drawing Sheets

(51) Int. Cl.
*H04L 41/082* (2022.01)
*H04L 61/4511* (2022.01)
*H04L 67/54* (2022.01)
*H04L 67/55* (2022.01)

(52) U.S. Cl.
CPC .......... *H04L 61/4511* (2022.05); *H04L 67/54* (2022.05); *H04L 67/55* (2022.05)

(58) Field of Classification Search
USPC .......................................................... 709/220
See application file for complete search history.

(56) References Cited

U.S. PATENT DOCUMENTS

2002/0010767 A1* 1/2002 Farrow ................... H04L 41/00
709/223
2008/0298367 A1* 12/2008 Furukawa ......... H04L 29/12216
370/392
2012/0117621 A1* 5/2012 Kondamuru .......... H04L 63/168
726/3
2016/0380961 A1* 12/2016 Backholm ............. H04L 47/286
709/245
2017/0214574 A1* 7/2017 Kanojia .............. H04L 41/0813
2017/0279617 A1* 9/2017 Blinn .................... H04L 9/3247

* cited by examiner

PROPAGATING INFORMATION WITH NETWORK NODES

CROSS-REFERENCE TO RELATED APPLICATIONS

This application is a national phase application pursuant to 35 U.S.C. § 371 of International Application No. PCT/US2018/044444 filed Jul. 30, 2018, which claims priority to U.S. Provisional Patent Application Ser. No. 62/539,504 filed Jul. 31, 2017, the disclosures of which are hereby incorporated by reference herein.

SUMMARY

Domain Name Service (DNS) protocol is used to propagate information to network devices capable of making domain name zone transfer requests, or from network devices capable of making dynamic DNS update requests. Methods incorporating techniques described in this paper may include transmitting configuration information from a configuration datastore to network devices. Systems incorporating techniques described in this paper may incorporate techniques associated with transmitting configuration information from a configuration datastore to network devices. Methods incorporating techniques described in this paper may include transmitting information related to usage of network devices to a reporting system. Systems incorporating techniques described in this paper may incorporate techniques associated with transmitting information related to usage of network devices to a reporting system.

DETAILED DESCRIPTION

Figure 1:
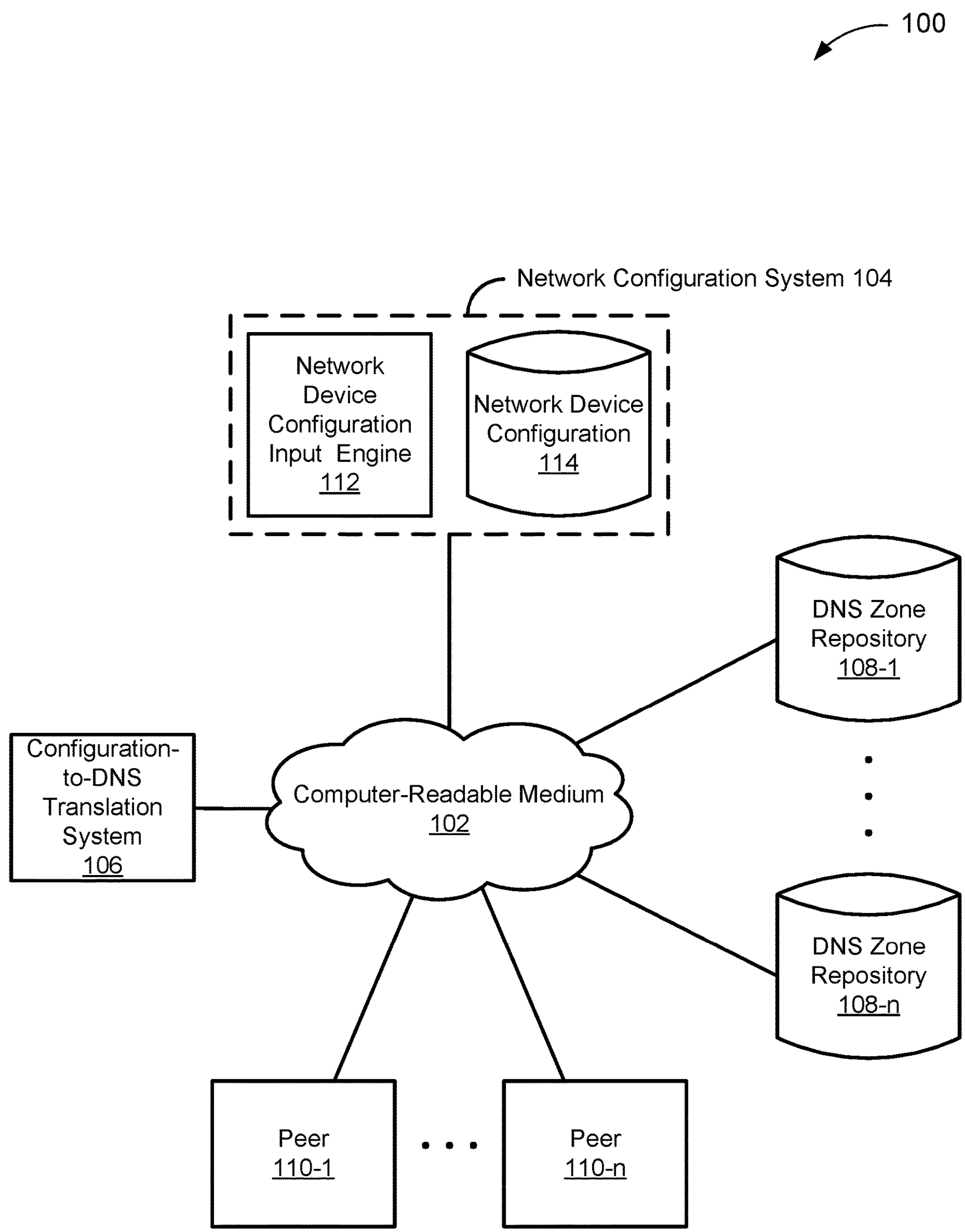
FIG. 1 depicts a diagram of an example of a peer-triggered network device configuration propagation system.

FIG. 1 depicts a diagram 100 of an example of a peer-triggered network device configuration propagation system. The diagram 100 includes a computer-readable medium (CRM) 102, a network configuration system 104, a configuration-to-DNS translation system 106, a DNS zone repository 108-1 to DNS zone repository **108-*n* (collectively, the DNS zone repositories 108), and a peer 110-1 to a peer 110-*n* (collectively, the peers 110). The network configuration system 104, the configuration-to-DNS translation system 106, the DNS zone repositories 108, and the peers 110 are coupled to the CRM 102**.

The CRM 102 and other CRMs discussed in this paper are intended to include all mediums that are statutory (e.g., in the United States, under 35 U.S.C. 101), and to specifically exclude all mediums that are non-statutory in nature to the extent that the exclusion is necessary for a claim that includes the CRM to be valid. Known statutory CRMs include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Depending upon implementation-specific or other considerations, the CRM 102 can include wired communication interfaces and wireless communication interfaces for communicating over wired or wireless communication channels. Where a first component is located on a first device and a second component is located on a second (different) device, the CRM 102 can include a wireless or wired back-end network or LAN. The CRM 102 can also encompass a relevant portion of a WAN or other network, if applicable. Enterprise networks can include geographically distributed LANs coupled across WAN segments. For example, a distributed enterprise network can include multiple LANs (each LAN is sometimes referred to as a Basic Service Set (BSS) in IEEE 802.11 parlance, though no explicit requirement is suggested here) separated by WAN segments. An enterprise network can also use VLAN tunneling (the connected LANs are sometimes referred to as an Extended Service Set (ESS) in IEEE 802.11 parlance, though no explicit requirement is suggested here). Depending upon implementation or other considerations, the CRM 102 can include a private cloud under the control of an enterprise or third party, or a public cloud.

The devices, systems, and CRMs described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a CRM for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical CRM on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Returning to the example of FIG. 1, the network configuration system 104 is intended to represent part of an enterprise network, which may include a systems administrator and other human personnel, responsible for setting and maintaining network device configurations. In the diagram 100, the network configuration system 104 includes a network device configuration input engine 112 and a network device configuration datastore 114.

The network device configuration input engine 112 is intended to represent an interface, such as a GUI for human-entered data, by which network device configuration information is entered manually, entered using an automated process, or both. For example, one or more of the policy-aware network device configuration nodes 306, or agents thereof, can input network device configuration data, which the network device configuration input engine 112 stores in the network device configuration datastore 114.

In the example of FIG. 1, the configuration-to-DNS translation system 106 is intended to represent a system that turns network device configurations from the network configuration system 104 into DNS records that include network device configuration data. In a specific implementation, changes to the network device configuration datastore 114 trigger the configuration-to-DNS translation system 106 to create DNS records, such as DNS TXT records, that encode the network device configuration data for storage in a DNS zone. As used in this paper, an area of one or more subdomains that has been delegated for management is called a DNS zone.

For context, top-level domain name registry operators may offer name spaces to the public or to entities with mandated geographic or otherwise scoped purpose for registration of second-level domains. An organization in charge of a lower level domain may operate its name space similarly and subdivide its space. Each registration or allocation of subdomain space obligates the registrant to maintain an administrative and technical infrastructure to manage the responsibility for the zone, including sub-delegation to lower-level domains. A zone starts at a domain boundary to include leaf nodes (hosts) in the domain, or ends at the boundary of another independently managed zone. As each domain is further divided into sub-domains, each becoming a DNS zone itself with its own set of administrators and DNS servers, the tree grows with the largest number of leaf nodes at the bottom. At this lowest level, in the end-nodes or leaves of the tree, the term DNS zone becomes essentially synonymous with the term "domain", both in terms of use and administration. The term domain is used in the business functions of the entity assigned to it and the term zone is usually used for configuration of DNS services.

In a specific implementation, the configuration-to-DNS system 106 uses knowledge of DNS zones, e.g., distinct, contiguous portions of a domain name space in the DNS for which administrative responsibility has been delegated to respective single managers, to store in the DNS zone repositories 108 the DNS records in association with, and identifiable as being associated with, a respective plurality of DNS zones. For example, the configuration-to-DNS translation system 106 can increase a serial number of an start of authority (SOA) record associated with a DNS zone that has changed, which labels the DNS zone as ready for propagation.

For context, a DNS zone can be defined in an operating system file that starts with a SOA and contains records of resources described within the zone. The format was originally used by the Berkeley Internet Name Domain Server (BIND) software package and is defined in RFC 1034 and RFC 1035, which are incorporated herein by reference.

Advantageously, the configuration-to-DNS translation system 106 causes DNS records to include network device configurations, which enables distribution of the network device configurations via a DNS service as described later in this paper. In an alternative, instead or in addition, the DNS records include telemetry data. In yet another alternative, instead or in addition, the DNS records include key management data.

In the example of FIG. 1, the DNS zone repositories 108 are intended to represent records for resources described within a DNS zone implemented in a configuration system of a domain name server. Storage of network device configuration messages in the DNS zone repositories 108 can be characterized as loading network device configuration data into a DNS service for propagation to applicable network nodes. An example of a DNS record is:

<device_id>.version1.config.threatstop.com 900 IN TXT "param=value"

In the example of FIG. 1, the peers 110 are intended to represent devices with wired or wireless interfaces through which the peers 110 can send and receive data over the CRM 102. Examples of peers 110 are desktop computers, laptop computers, tablet computers, wireless devices (such as cellular phones, smartphones, or the like), or wearable devices, to name several.

In a specific implementation, the peers 110 include unique identifiers which can be used in the transmission of data through a network. Unique identifiers can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the peers 110 can include applicable communication interfaces for receiving and sending data according to an applicable wireless device protocol. Examples of applicable wireless device protocols include Wi-Fi, ZigBee®, Bluetooth®, and other applicable low-power communication standards.

In a specific implementation, the peers 110 act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the peers 110 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the peers 110 include a DNS engine. Depending upon implementation- or configuration-specific factors, the DNS engine can include a DNS server or a DNS client. Further depending upon implementation- or configuration-specific factors, the DNS engine can include, a telemetry subsystem (not shown) or a configuration subsystem, the latter including a configuration engine and a configuration datastore (not shown), both of which are discussed later. In an implementation in which one or more of the peers 110 includes a telemetry subsystem, the network configuration system 104 may include a telemetry reader (not shown).

In an example of operation, a system such as is illustrated in FIG. 1 operates as follows. The network configuration system 104 provides a configuration set for network devices over the CRM 102 to the configuration-to-DNS-translation system 106. The network configuration system 104 may provide the configuration set in response to a trigger, such as detecting a change to a network device configuration. The network device configuration set can include a full or partial configuration for a network device. For example, the network device configuration set may include only a delta, which is a partial configuration that includes the differences between a previous configuration and a current configuration. It may be noted, providing a delta imposes some requirements on a peer, which can be managed using, for example, a telemetry subsystem or a configuration subsystem.

In this example of operation, the configuration-to-DNS-translation system 106 converts the network device configuration set into a DNS message, which is stored in one or more of DNS repositories 108. Depending upon implementation- or configuration-specific factors, the network device configuration set may be provided in a format that is unsuitable for encapsulation (or inclusion) within an applicable DNS message, in which case the configuration-to-DNS translation system 106 first converts the network device configuration set to a DNS message-compatible format and then includes the reformatted network device configuration set in a DNS message. In a specific implementation, the reformatted network device configuration set has a proprietary format understood by at least one of the peers 110. In an alternative, the reformatted network device configuration set has a standardized format. The reformatting may or may not include encryption and may or may not include decryption.

In this example of operation, the DNS zone repositories 108 buffer the network device configuration set messages to be provided to the peers 110. In a specific implementation, the network device configuration set messages are provided to the one or more of the peers 110 that initiated a triggering stimulus, such as an AXFR query or an IXFR query, to the network configuration system 104. (RFCs 5936, 1995, and 1996 are incorporated by reference.) Thus, the network device configuration set messages are provided in response to a triggering stimulus from a peer. For a network configuration system 104 that includes a telemetry reader, on the other hand, it may not be necessary to provide the network device configuration set messages to the peer. Rather, the DNS zone repositories 108 can be updated in accordance with a telemetry reader and responsive to a dynamic DNS update. This alternative may entail implementing a telemetry engine at one or more of the peers 110.

The party responsible for providing the network device configurations and the party that translates the network device configurations into a DNS-compatible format need not be the same party. For example, a customer of a DNS service could provide network device configuration to the DNS service, which translates the network device configurations into a DNS-compatible format when the customer sends a DNS query or dynamic DNS update. Conceptually, the network configuration system 104 and the configuration-to-DNS translation system 106 can be characterized as part of the DNS service. Specifically, the network configuration system 104 will at least include a datastore that buffers data for use by the configuration-to-DNS translation system 106, and even the minimalist buffer can be characterized as a network configuration system under the control of the DNS service. Similarly, the DNS zone repositories 108 at least include a buffer from which the DNS service propagates the DNS records of the DNS zone repositories 108. The peers 110, on the other hand, may be under the control of one or more customers of the DNS service.

In this example of operation, the peers 110, or agents associated therewith, trigger the network configuration system 104 with a DNS query and the peers 110 receive respective responses including updated network device configurations. For example, where the network configuration system 104, the configuration-to-DNS translation system 106, and the DNS zone repositories 108 are controlled by a DNS service, a customer of the DNS service can provide the network device configurations via one of the peers 110 or some other device, as well as the trigger from the one of the peers 110. It may be desirable to the DNS service to receive telemetry data from the customer, as well. Accordingly, for illustrative purposes in this example of operation, the customer sends telemetry data back to the DNS service.

As was previously indicated, a telemetry subsystem can make an explicit DNS response to the applicable peers unnecessary, though the peers 110 still trigger network device configuration propagation with, e.g., a dynamic DNS update. In any case, the above-described example of operation provides an understanding of peer-triggered network device configuration propagation from a network configuration system to DNS zones.

Figure 2:
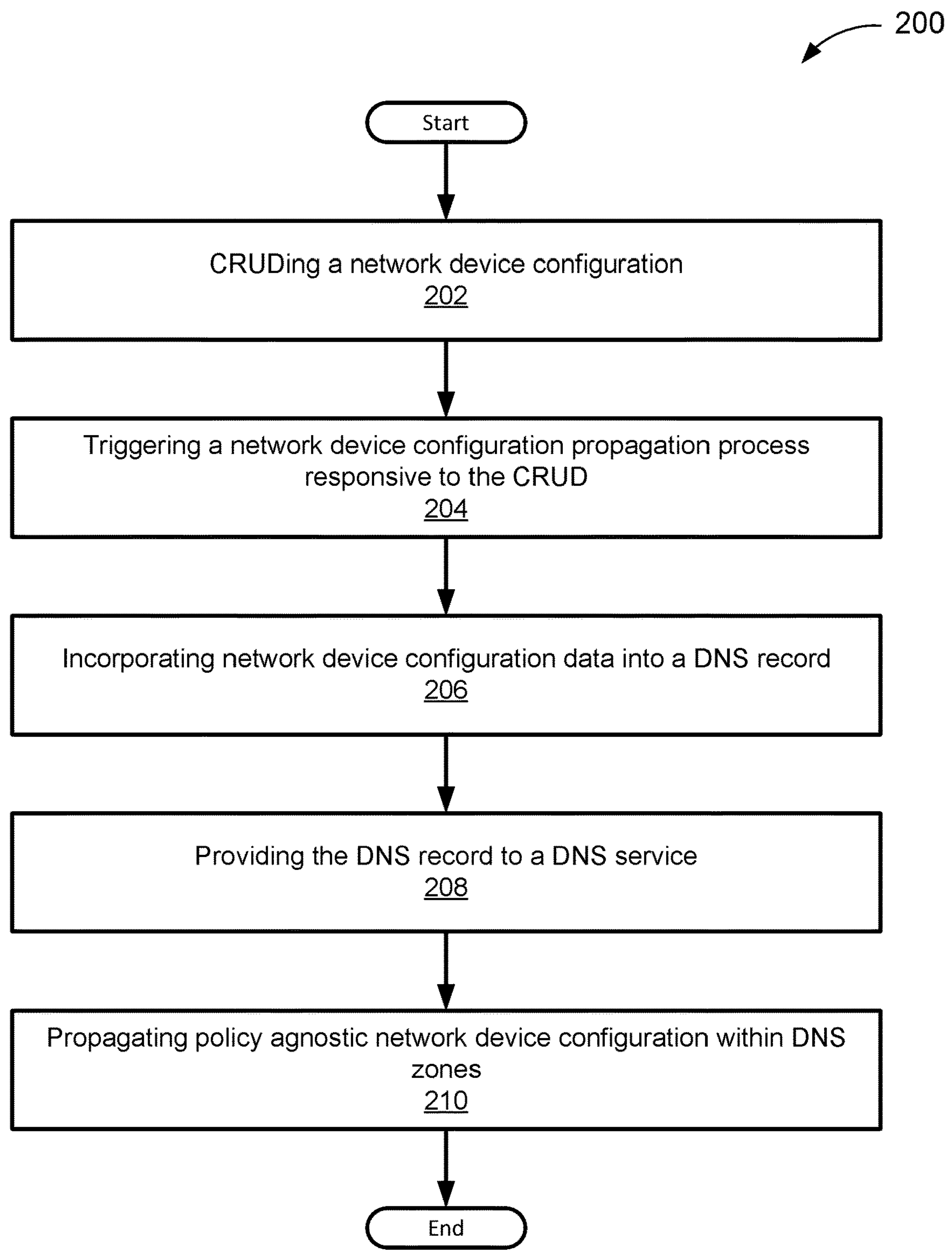
FIG. 2 depicts a flowchart of an example of a method for peer-triggered network device configuration propagation from a network configuration system to DNS zones.

FIG. 2 depicts a flowchart 200 of an example of a method for peer-triggered network device configuration propagation from a network configuration system to DNS zones. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit. The flowchart 200 starts at module 202, with creating, reading, updating, or deleting (CRUDing) a network device configuration. In a specific implementation a system operator or automated process configures network devices. The system operator or automated process may be associated with a customer of a DNS service. It may be noted reading, creating then deleting, and updating and updating to undo the previous update could result in no net delta. However, such activity could trigger other processes, such as a security process.

In the example of FIG. 2, the flowchart 200 continues to module 204 with triggering a network device configuration propagation process responsive to the CRUD. How the CRUD is detected is implementation- and/or configuration-specific. For example, detecting the CRUD instruction, detecting a datastore access, identifying a delta in a current datastore relative to a prior datastore, or the like could trigger the process. Advantageously, the network device configurations can be buffered in the form of DNS records associated with one or more DNS zones to be propagated using DNS.

In the example of FIG. 2, the flowchart 200 continues to module 206 with incorporating network device configuration data into a DNS record.

In the example of FIG. 2, the flowchart 200 continues to module 208 with providing the DNS record to a DNS service. Advantageously, the DNS service can treat the DNS record like any other DNS record, despite the fact the DNS record includes network device configuration data. The network device configuration propagation process is not a policy transfer because policy was previously set by, e.g., a system operator or automated process. Such a process is referred to herein as a policy agnostic network device configuration propagation process.

In the example of FIG. 2, the flowchart ends at module 210 with propagating policy agnostic network device configuration within DNS zones. In a specific implementation, the party setting policy for a zone is the party that provides network device configurations to a DNS service and then triggers the DNS service to propagate the network device configuration within DNS zones. Because the DNS service does not transfer policy, the propagation can be characterized as policy agnostic. Advantageously, network devices can be configured to use a DNS zone provided by the DNS service or to use distinct DNS zones. Regardless, multiple network devices can retrieve configurations from the same DNS service in this manner.

Figure 3:
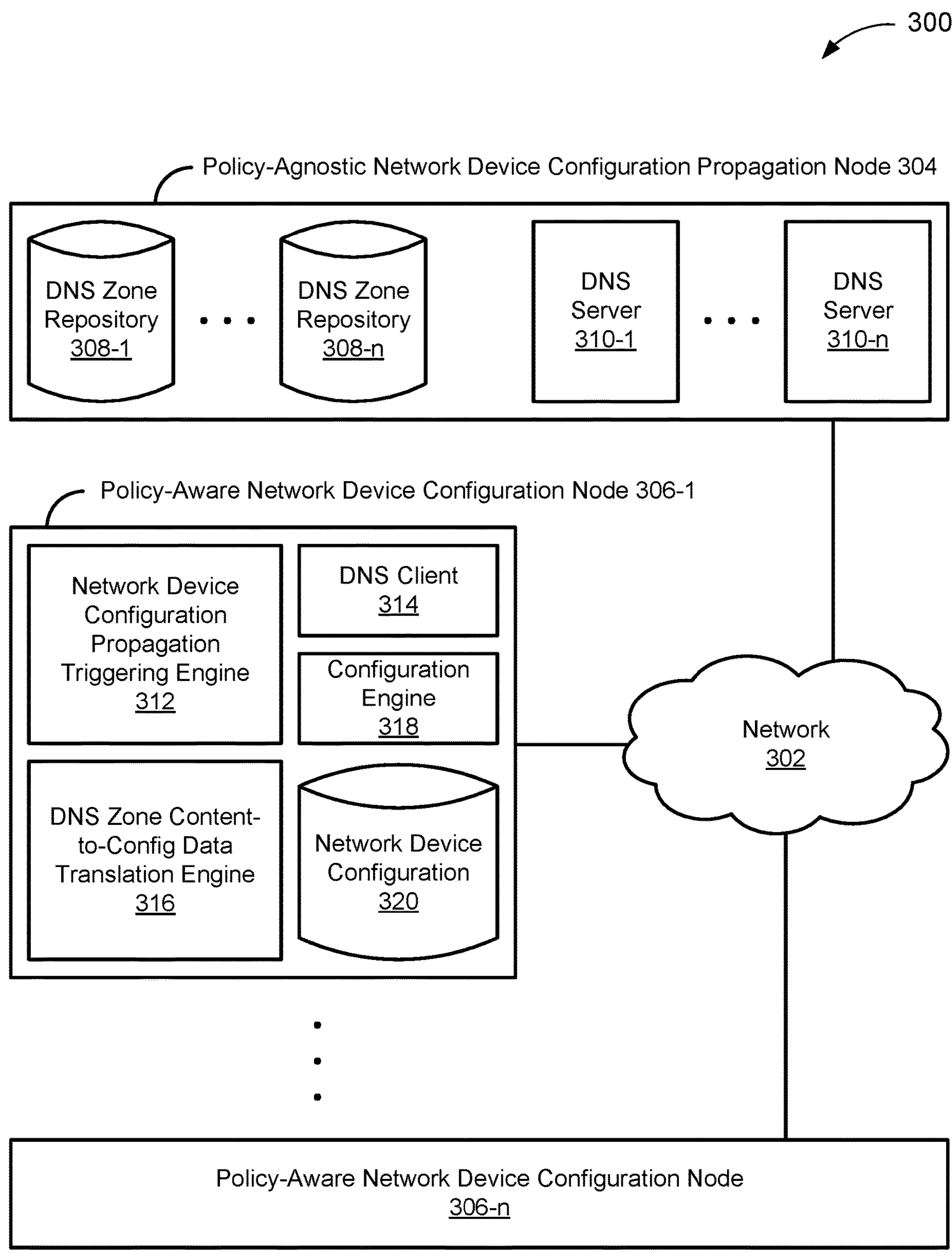
FIG. 3 depicts a diagram of an example of a DNS server to DNS client network device configuration propagation system.

FIG. 3 depicts a diagram 300 of an example of a DNS server to DNS client network device configuration propagation system. The diagram 300 includes a network 302, a policy-agnostic network device configuration propagation node 304 coupled to the network 302, and a policy-aware network device configuration node 306-1 to a policy-aware network device configuration node 306-*n* (collectively, the policy-aware network device configuration nodes 306) coupled to the network 302.

In the example of FIG. 3, the network 302 is intended, for illustrative purposes, to include a LAN, a WAN, a network of some other size, or a combination thereof. In a specific implementation, the policy-agnostic network device configuration propagation node 304 and the policy-aware network device configuration nodes 306 are operationally connected via Internet Protocol (IP) technologies. For example, the policy-agnostic network device configuration propagation node 304 and the policy-aware network device configuration nodes 306 can exist across a private network or across a public network, such as the Internet.

In the example of FIG. 3, the policy-agnostic network device configuration propagation node 304 is intended to represent a node that provides a DNS service through which network device configurations are provided in accordance with policies for the policy-aware network device configuration nodes 306. In the diagram 300, the policy-agnostic network device configuration propagation node 304 includes a DNS zone repository 308-1 to a DNS zone repository 308-*n* (collectively, the DNS zone repositories 308) and a DNS server 310-1 to a DNS server 310-*n* (collectively, the DNS servers 310).

In the example of FIG. 3, the DNS zone repositories 308 are intended to represent datastores of configured to store DNS records associated with, and have network device configuration information for, one or multiple network devices.

In the example of FIG. 3, the DNS servers 310 are intended to represent engines that respond to DNS queries with the DNS records having network device configuration data, which the policy-aware network device configuration nodes 306 use to configure network devices.

In the example of FIG. 3, the policy-aware network device configuration nodes 306 are intended to represent nodes that send a DNS query to the policy-agnostic network device configuration propagation node 304 to trigger a DNS response that includes network device configuration data, which the policy-aware network device configuration nodes 306 use to configure network devices. In the diagram 300, the policy-aware network device configuration nodes 306 include a network device configuration propagation triggering engine 312, a DNS client 314, a DNS zone content-to-config data translation engine 316, a configuration engine 318, and a network device configuration datastore 320.

In a specific implementation, the network device configuration propagation triggering engine 312 issues a DNS request to the DNS client 314. Depending upon implementation- or configuration-specific factors, one of more of the DNS servers 310 can send a NOTIFY message to the DNS client 314 when a change to zone data has been made, though the scheduling of zone transfers is entirely under the control of the network device configuration propagation triggering engine 312. In a specific implementation, the network device configuration propagation triggering engine 312 schedules zone transfers at regular intervals, in a pattern controlled by the values in the "refresh", "retry", and "expire" fields in the SOA resource record of the zone apex. The frequency and periodicity of the trigger depend upon implementation- or configuration-specific factors, as is whether the trigger is manual or automatic.

In a specific implementation, the DNS client 314 first connects to one of the DNS servers 310. A cryptographic protocol, such as Transport Layer Security (TLS) or its predecessor Secure Sockets Layer (SSL) can provide communications security over the network 302. Advantageously, the connection can be made secure due to symmetric cryptography used to encrypt the data transmitted. The keys for this symmetric encryption are generated uniquely for each connection and are based on a shared secret negotiated at the start of the session. The DNS servers 310 and the DNS client 314 negotiate details of which encryption algorithm and cryptographic keys to use before transmitting data. Alternatively or in addition, the identity of the DNS servers 310 and the DNS client 314 can be authenticated using public-key cryptography, which may be required for one or both parties. Alternatively or in addition, each message includes a message integrity check using a message authentication code to prevent undetected loss or alteration of data during transmission. In this way, the connection can ensure integrity.

After the DNS client 314 connects to one of the DNS servers 310, the DNS client 314 initiates a DNS asynchronous full transfer zone (AXFR). A zone transfer uses the Transmission Control Protocol (TCP) for transport. The DNS servers 310 and DNS client 314 are so named because the zone transfer takes the form of a client-server transaction. It should be noted the client requesting a zone transfer may be a slave server or a secondary server, requesting data from a master server.

Zone transfer comprises a preamble followed by the actual data transfer. The preamble comprises a lookup of a Start of Authority (SOA) resource record for the "zone apex," which is the node of the DNS namespace that is at the top of the "zone". The fields of this SOA resource record, in particular the "serial number", determine whether the actual data transfer needs to occur at all. The client compares the serial number of the SOA resource record with the serial number in the last copy of that resource record that it has. If the serial number of the record being transferred is greater, the data in the zone are deemed to have "changed" (in some fashion) and the slave proceeds to request the actual zone data transfer. If the serial numbers are identical, the data in the zone are deemed not to have "changed", and the client may continue to use the copy of the database that it already has, if it has one.

In a specific implementation, the DNS client 314 performs the SOA lookup of the preamble using a DNS query resolution mechanism. The DNS client 314 does not open a TCP connection to one of the DNS servers 310 until the DNS client 314 identifies a need to perform the actual data transfer. In an alternative, the DNS client 314 opens a TCP connection to one of the DNS servers 310 before performing the SOA lookup preamble over the same TCP connection as they then (may) perform the actual data transfer.

The actual data transfer process begins by the DNS client 314 sending a query (opcode 0) with the special query type AXFR (value 252) over the TCP connection to one of the DNS servers 310. The DNS server 310 responds with a series of response messages, comprising all of the resource records for every domain name in the zone. The first response comprises the SOA resource record for the zone apex. The other data follows in no specified order. The end of the data is signaled by the relevant DNS server 310 repeating the response containing the SOA resource record for the zone apex.

The DNS client 314 may use a Transaction SIGnature (TSIG) to authenticate the one of the policy-aware network device configuration nodes 306 containing the DNS client 314. TSIG uses shared secret keys and one-way hashing to provide a cryptographically secure way of authenticating the DNS servers 310 and the DNS clients 310 as being allowed to make or respond to a DNS update. Depending upon implementation- or configuration-specific factors, queries to DNS may be made without authentication, but updates to DNS must be authenticated. A timestamp is included in the TSIG protocol to prevent recorded responses from being reused. This may place a requirement on the DNS servers 310 and the DNS client 314 to have an accurate clock. The Network Time Protocol can provide an accurate time source. DNS updates, like queries, are normally transported via UDP, but the DNS servers 310 can support both UDP and TCP requests. TSIG is described in RFC 2845, which is incorporated by reference.

Unless otherwise interrupted, the DNS client 314 eventually makes network device configuration data from the AXFR response available to the DNS zone content-to-config data translation engine 316.

The DNS zone content-to-config data translation engine 316 reads the response, or at least the zone contents, and decodes network configuration data from the response. If the information includes a checksum, the DNS zone content-to-config data translation engine 316 can ensure its integrity with a checksum process. The DNS zone content-to-config data translation engine 316 provides the network device configuration data to the configuration engine 318.

The configuration engine 318 writes the configuration to the network device configuration datastore 320. A typical implementation for the configuration datastore 320 would be as a "config file;" there is a strong tradition of config files being in human-editable plain text and a simple key-value pair format is common. Advantageously, the techniques described in this paper facilitate the use of text when encoding data in DNS records and passing this easy-to-use format around in a secure way. In an alternative, state information is used to trigger other software processes.

In an example of operation, a system such as is illustrated in FIG. 3 operates as follows. Responsive to changes to one or more of the DNS zone repositories 308, the or more of the DNS servers 310 may send a NOTIFY message from the policy-agnostic network device configuration propagation node 304 to one or more of the policy-aware network device configuration nodes 306. In an alternative, the DNS servers 310 do not send NOTIFY messages.

In this example of operation, the network device configuration propagation triggering engine 312 determines whether to initiate a network device configuration propagation process. If the DNS servers 310 are capable of sending NOTIFY messages the network device configuration propagation triggering engine 312 may initiate the process in response to receiving a NOTIFY message. Alternatively, if the DNS servers 310 do not send NOTIFY messages, or in addition to acting responsively to a NOTIFY message, the network device configuration propagation triggering engine 312 can periodically initiate the process or initiate the process in response to an explicit instruction (e.g., by a systems administrator). The network device configuration propagation triggering engine 312 may choose to take no periodic action if it is sure (correct or not) there have been no changes to a relevant one or more of the DNS zone repositories 308. To trigger the process, the network device configuration propagation triggering engine 312 sends a DNS request to the DNS client 314.

In this example of operation, the DNS client 314 establishes a connection with a relevant one of the DNS servers 310 over the network 302. Assuming the connection is not aborted due to, for example, a determination that no changes have been made to a relevant one or more of the DNS zone repositories 308 since a last zone transfer, the DNS client 314 sends a DNS zone transfer (e.g., AXFR) query to the DNS server 310, which responds with a DNS response that includes network device configuration data.

In this example of operation, the DNS zone content-to-config data translation engine 316 decodes the network device configuration data content into a format suitable for storage in the network device configuration datastore 320 by the configuration engine 318.

Figure 4:
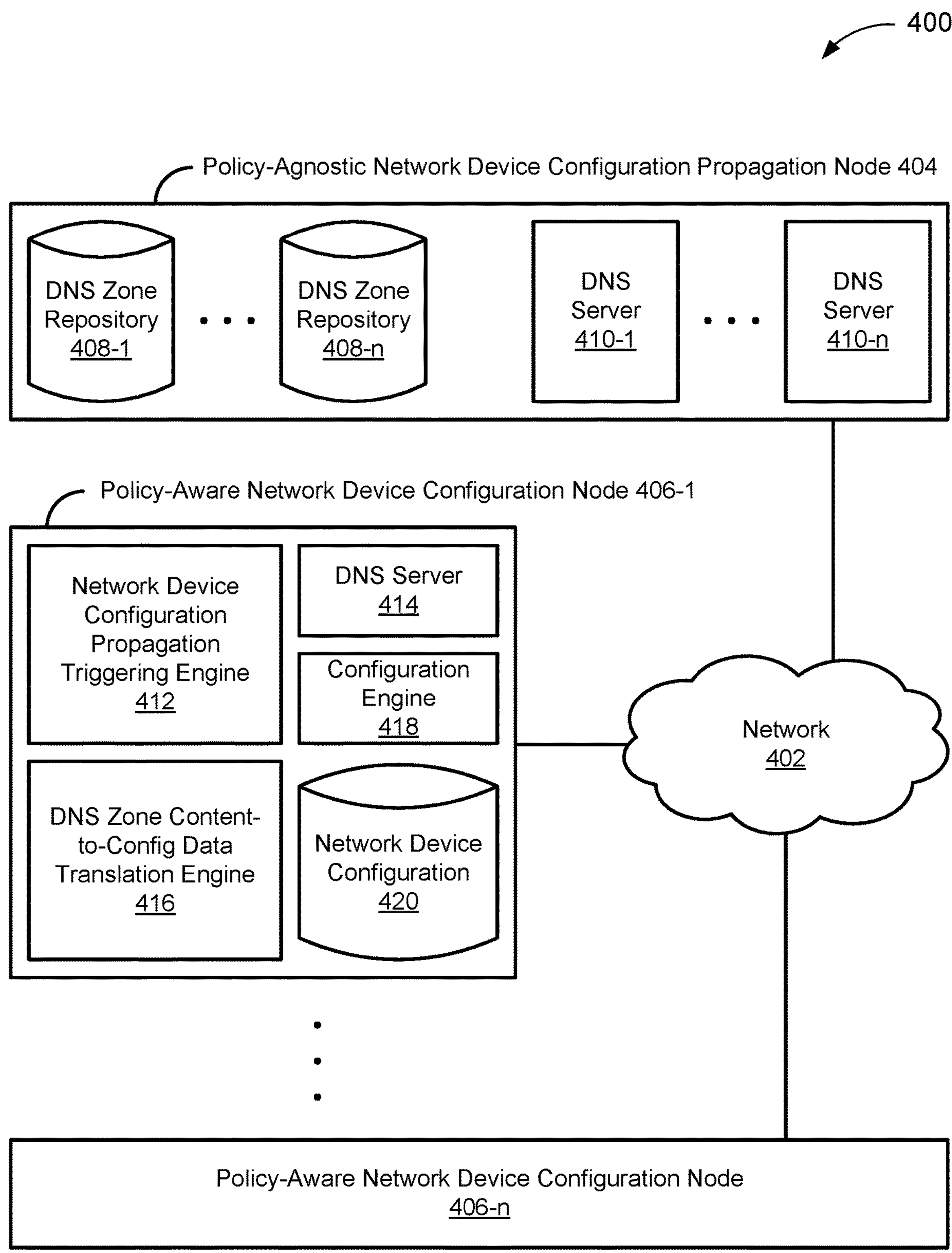
FIG. 4 depicts a diagram of an example of a DNS server to slave or secondary DNS server network device configuration propagation system.

FIG. 4 depicts a diagram 400 of an example of a DNS server to slave or secondary DNS server network device configuration propagation system. The diagram 400 includes a network 402, a policy-agnostic network device configuration propagation node 404 coupled to the network 402, and a policy-aware network device configuration node 406-1 to a policy-aware network device configuration node **406-*n* (collectively, the policy-aware network device configuration nodes 406) coupled to the network 402. The diagram 400 is similar to the diagram 300, but the DNS client 314 is replaced with a DNS server 414. In the example of FIG. 4, the DNS servers 410 are similar to the DNS servers 310 (FIG. 3) and the DNS zone repositories 408 are optional. Specifically, the zone transfer request can include AXFR queries, as described by way of example with reference to FIG. 3**, or IXFR queries for incremental zone transfers.

Incremental zone transfer differs from full zone transfer in the following respects: First, the DNS server 414 (acting as a DNS client) uses QTYPE IXFR (value 251) instead of the AXFR QTYPE. Second, the DNS server 414 sends an SOA resource record for the zone apex that it currently has, if any, in the IXFR message, letting the server know which version of the "zone" it believes to be current. Third, though the relevant one of the DNS servers 410 may respond in the normal AXFR manner with the full data for the zone, it may also instead respond with an "incremental" data transfer. The latter comprises a list of changes to zone data, in zone serial number order, between the version of the zone that the client reported to the server as having and the version of the zone that is current at the server. The changes comprise two lists, one of resource records that are deleted and one of resource records that are inserted. (A modification to a resource record is represented as a deletion followed by an insertion.)

In addition to the DNS server 414, the policy-aware network device configuration nodes 406 include a network device configuration propagation triggering engine 412, a DNS zone content-to-config data translation engine 416, a configuration engine 418, and a network device configuration datastore 420. Because the policy-aware network device configuration nodes 406 have a server, the DNS server 414, additional peers with DNS engines (servers or clients) downstream from the policy-aware network device configuration nodes 406 may or may not exist.

Figure 5:
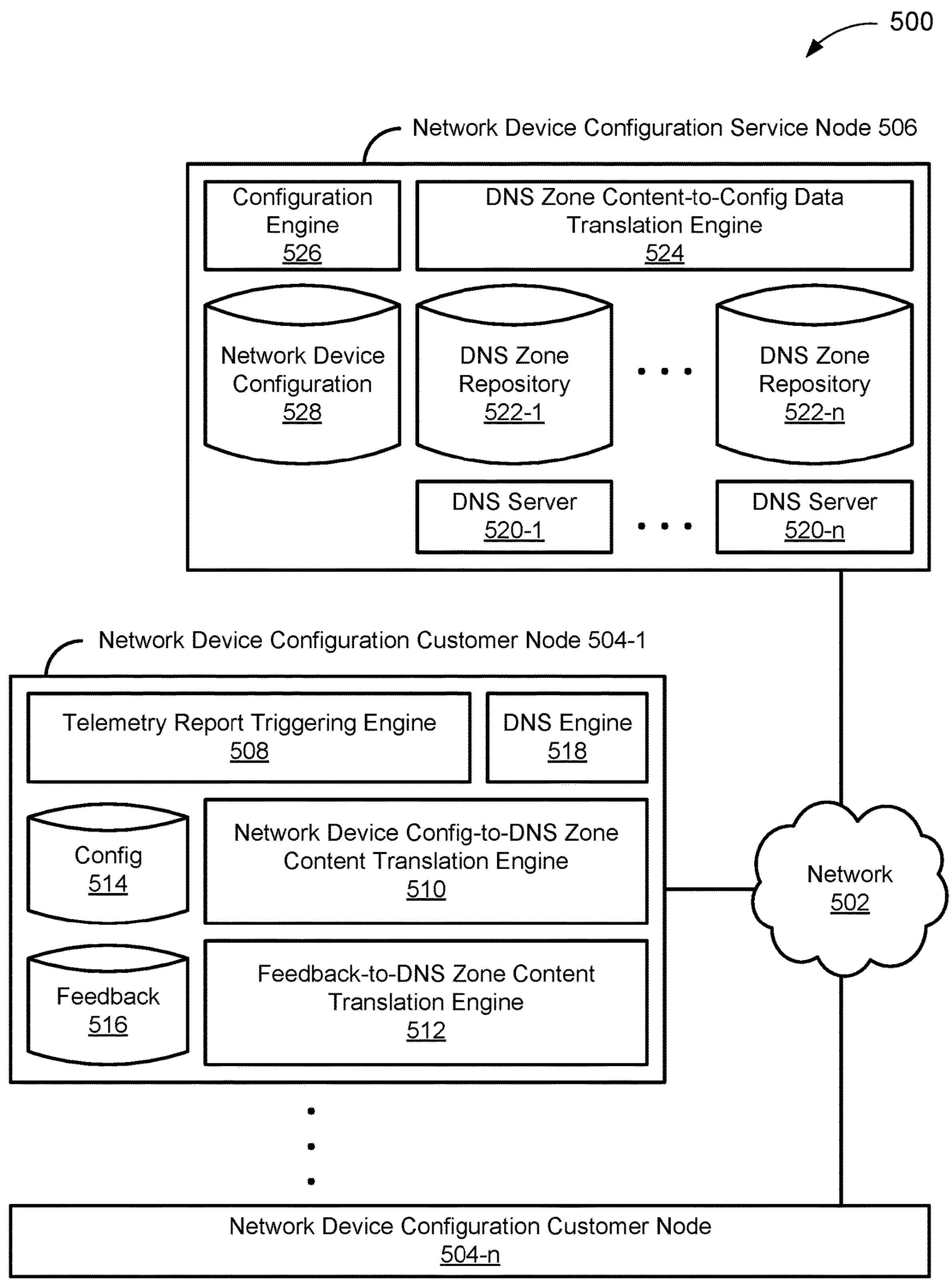
FIG. 5 depicts a diagram of an example of a DNS engine to DNS server network device telemetry provisioning system.

FIG. 5 depicts a diagram 500 of an example of a DNS engine to DNS service network device configuration telemetry provisioning system. The diagram 500 includes a network 502, a network device configuration customer node 504-1 to a network device configuration customer node **504-*n* (collectively, the network device configuration customer nodes 504) coupled to the network 502, and a network device configuration service node 506**.

In the example of FIG. 5, the network 502 is intended, for illustrative purposes, to include a LAN, a WAN, a network of some other size, or a combination thereof. In a specific implementation, the network device configuration customer nodes 504 and the network device configuration service node 506 are operationally connected via Internet Protocol (IP) technologies. For example, the network device configuration customer nodes 504 and the network device configuration service node 506 can exist across a private network or across a public network, such as the Internet.

In the example of FIG. 5, the network device configuration customer nodes 504 are intended to represent engines and datastores under the control of an entity receiving network device configuration service via DNS. In the diagram 500, the network device configuration customer nodes 504 include a telemetry report triggering engine 508, a network device config-to-DNS zone content translation engine 510, a feedback-to-DNS zone content translation engine 512, a config datastore 514, a feedback datastore 516, and a DNS engine 518 (which can include a DNS server or a DNS client).

The telemetry report triggering engine 508 is intended to represent an engine responsible for initiating an information collection process that ultimately provides telemetry to the network device configuration service node 506. In a specific implementation, the telemetry report triggering engine 508 includes a timer that causes periodic triggering stimuli to initiate the telemetry process. Instead or in addition, the telemetry report triggering engine 508 can initiate the telemetry process in response to an explicit command to do so (e.g., a "manual" instruction provided by a human or an agent thereof).

When initiating the process, the telemetry report triggering engine 508 causes the network device config-to-DNS zone content translation engine 510 and the feedback-to-DNS zone content translation engine 512 to access, respectively, the config datastore 514 and the feedback datastore 516 and convert the network device configuration data and the feedback into DNS records for transmission by the DNS engine 518 to the network device configuration service node 506.

The feedback in the feedback datastore 516 can include information returned by software commands, log data, or characteristics of a network, such as settings, software version information, error conditions, or performance data, to name a few. Just as the network device config-to-DNS zone content translation engine 510 encodes network device configuration data as DNS records, such as DNS text records (DNS TXT records), having network device configuration data, the feedback-to-DNS zone content translation engine 512 encodes feedback as DNS records having feedback data.

The DNS engine 518 is capable of making DNS requests. If using public DNS infrastructure, the DNS engine 518 is configured with the name of the relevant DNS zone. In operation, the DNS engine 518 connects to the network device configuration service node 506. In a specific implementation, mutual authentication, such as that provided by TLS, is used. In a specific implementation, the DNS engine 518 performs a dynamic DNS update of the DNS zone provided in its configuration. The dynamic DNS update may be signed with a DNS TSIG key, thus authenticating the relevant one of the network device configuration customer nodes 504. If using private DNS infrastructure, the DNS configuration may need to include the IP address or hostname of the applicable DNS server. An example of a DNS record is:

<device_id>.version1.tele.threatstop.com 900 IN TXT "telemetry=value"

In the example of FIG. 5, the network device configuration service node 506 is intended to represent engines and datastores under the control (or under shared control with a customer) of an entity providing network device configuration propagation services using DNS. In the diagram 500, the network device configuration service node 506 includes a DNS server 520-1 to a DNS server **520-*n* (collectively, the DNS servers 520), a DNS zone repository 522-1 to a DNS zone repository 522-*n* (collectively, the DNS zone repositories 522), a DNS zone content-to-config data translation engine 524, a configuration engine 526, and a network device configuration datastore 528**.

A dynamic DNS update is received and processed by a relevant one of the DNS servers 520, resulting in the creation of DNS records for storage in a relevant one of the DNS zone repositories 522. The DNS servers 520 can be part of a public or private DNS infrastructure. In a specific implementation, the DNS zone content-to-config data translation engine 524, responsive to a manual or automated trigger, reads the contents of the DNS zones contained in the DNS zone repositories 522, using a DNS zone transfer (e.g., AXFR), decodes the DNS records, and provides network device configuration data to the configuration engine 526, which stores the config data in the network device configuration datastore 526. Advantageously, the multiple network device configuration customer nodes 504 can disseminate information to the network device configuration service node 506. Each of the network device configuration customer nodes 504 can be configured to use the same DNS zone provided by the network device configuration service node 506 or one or more can use distinct DNS zones.

Figure 6A:
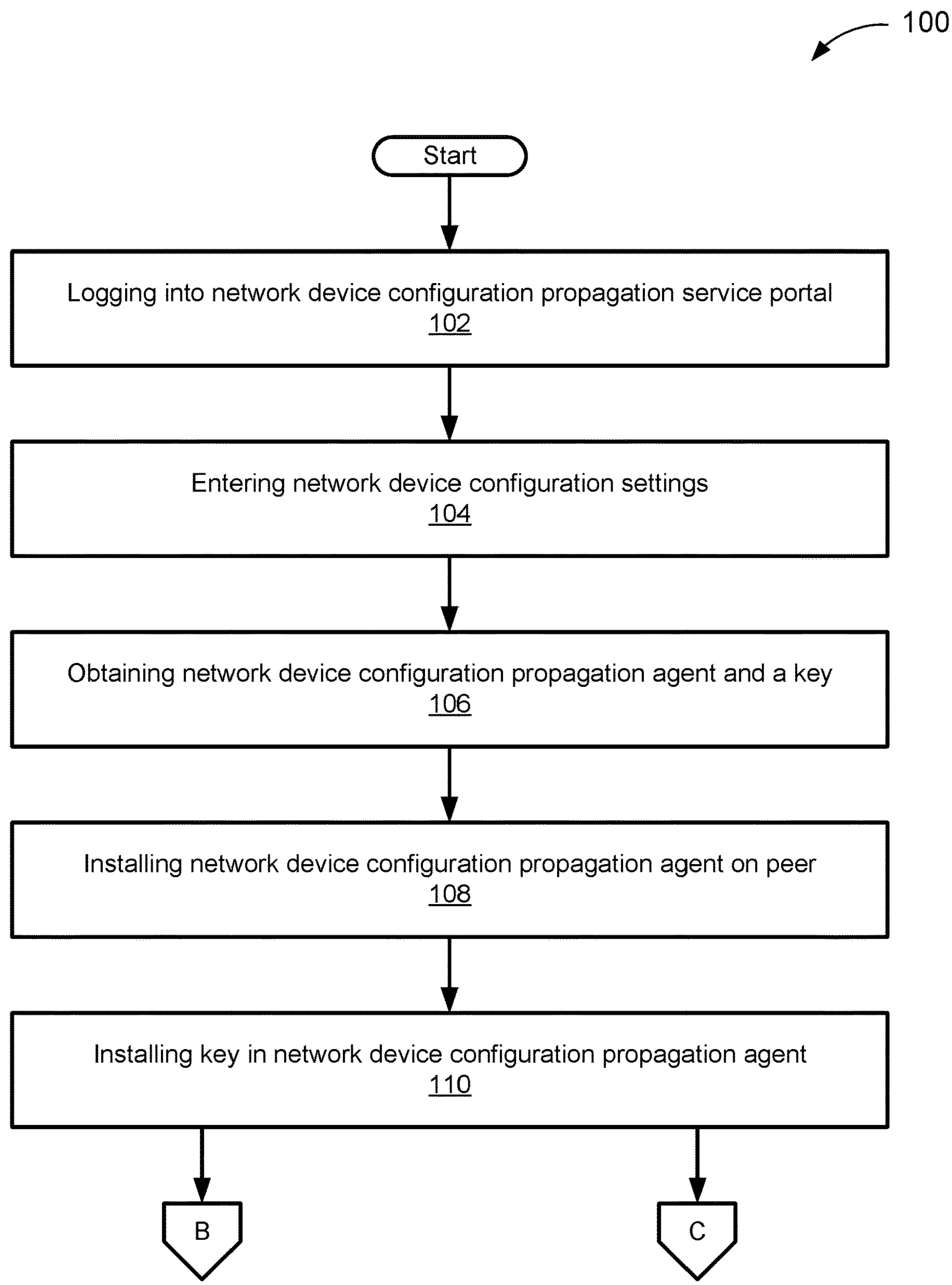
FIG. 6 depicts a flowchart of an example of a method for utilizing a network device configuration propagation system.
Figure 6B:
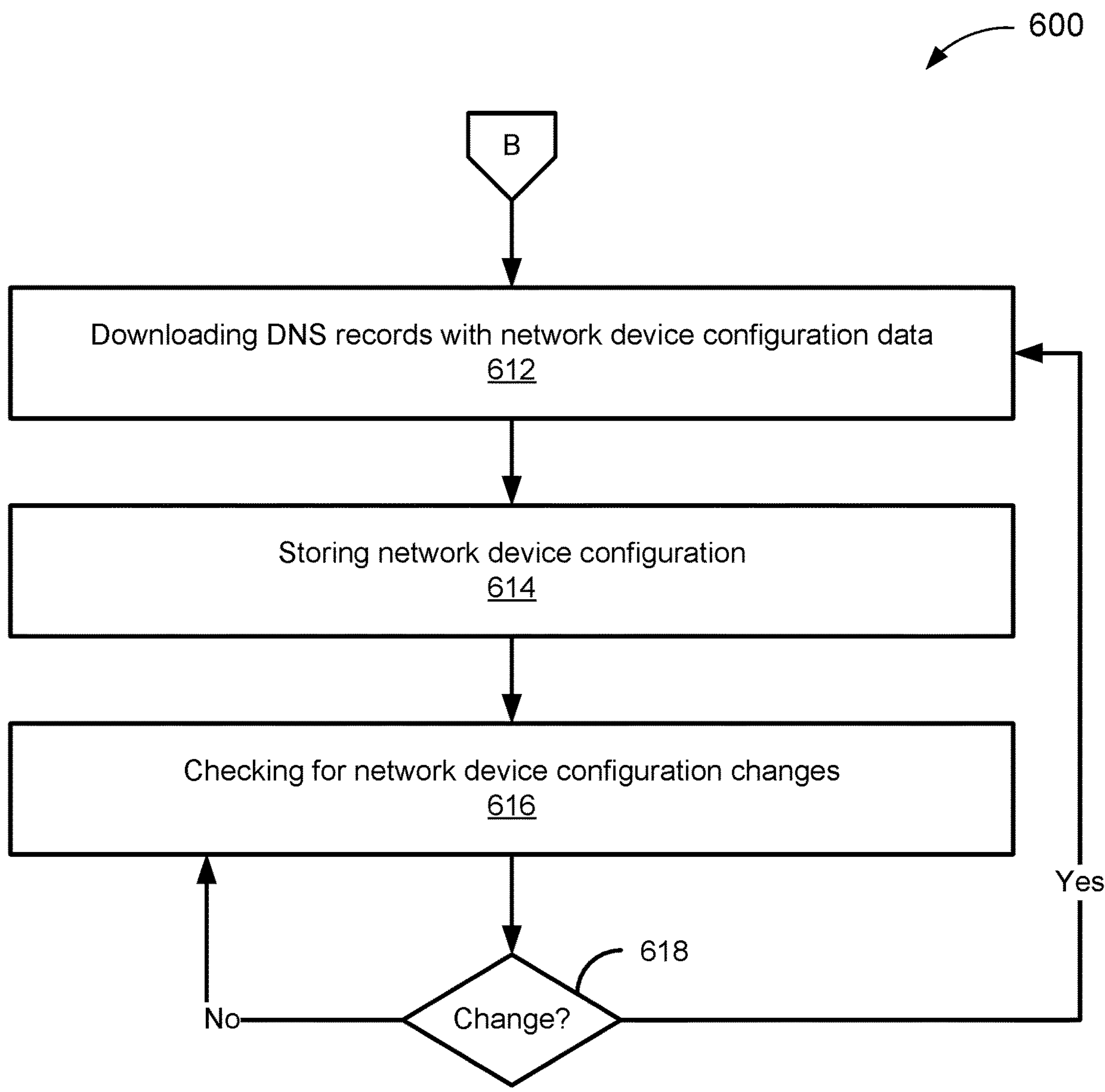
Figure 6C:
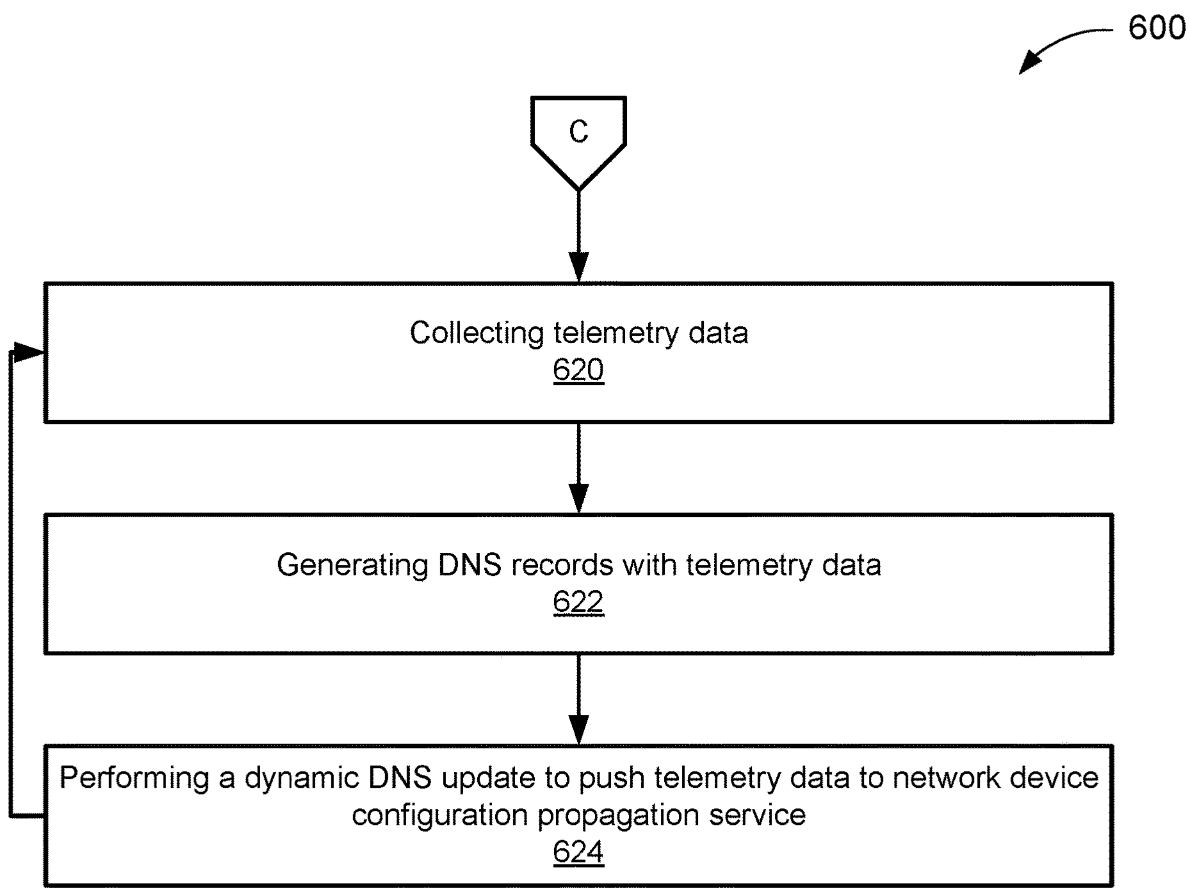

FIGS. 6A, 6B, and 6C depict a flowchart 600 of an example of a method for utilizing a network device configuration propagation system. The flowchart 600 starts at module 602 (FIG. 6A) with logging into a network device configuration propagation service portal. In a specific implementation, zone name is derived from IP address, which is made available during login. Depending upon implementation- or configuration-specific factors, the zone name could also be provided explicitly during or after login by the customer or an agent thereof.

In the example of FIG. 6A, the flowchart 600 continues to module 604 with entering network device configuration settings. Advantageously, the network device configuration settings are encoded in DNS records to take advantage of DNS infrastructure. Depending upon implementation- or configuration-specific factors, a customer may enter network configuration settings as DNS records or in some other format that is converted into DNS records by a network device configuration propagation service or agent thereof.

In the example of FIG. 6A, the flowchart 600 continues to module 606 with obtaining network device configuration propagation agent and a key. In a specific implementation, the network device configuration propagation agent is downloaded. In an alternative, the agent is streamed, provided virtually during runtime, or made available to a customer in some other manner. In a specific implementation, the key is derived from DNS zone name, which the customer provided explicitly, which was derived from the customer's IP address, or which was obtained in some other manner, and from a key associated with the relevant zone, such as a TSIG.

In the example of FIG. 6A, the flowchart 600 continues to module 608 with installing network device configuration propagation agent on peer. Depending upon implementation- or configuration-specific factors, a customer can have one or more peers. In a specific implementation, one entity, the network device configuration propagation service, is a service provider for all of the peers. In an alternative, the network device configuration propagation service has functionality distributed throughout a peer-to-peer network.

In the example of FIG. 6A, the flowchart 600 continues to module 610 with installing key in network device configuration propagation agent. The key can be used to provide both DNS zone name, from which it is derived, and secure communications with the network device configuration propagation service. From the module 610, the flowchart 600 splits into two different paths associated with propagation and telemetry, respectively.

In the example of FIG. 6B, the flowchart 600 continues to module 612 with downloading DNS records with network device configuration data. In a specific implementation, an application-level security check, such as a checksum, is performed to validate the network device configuration data. Advantageously, checksum enables a peer to know when configuration is done, which is a real-world problem.

In the example of FIG. 6B, the flowchart 600 continues to module 614 with storing network device configuration. In a specific implementation, the DNS records are decoded prior to storing.

In the example of FIG. 6B, the flowchart 600 continues to module 616 with checking for network device configuration changes. In a specific implementation, checking can be triggered periodically or manually with an explicit instruction.

In the example of FIG. 6B, the flowchart 600 continues to decision point 618 where it is determined whether a change to network device configurations has been detected. If it is determined a change to network configuration settings has been detected (618—Yes), then the flowchart 600 returns to module 612 and continues from there. If, on the other hand, it is determined a change to network device configurations has not been detected (618—No), then the flowchart 600 repeats module 616 and decision point 618 until a change to network device configurations has been detected.

In the example of FIG. 6C, the flowchart 600 continues (from module 610) to module 620 with collecting telemetry data. In a specific implementation, the telemetry data is collected periodically. The periodicity may vary depending upon need, but in a specific implementation, 15 minutes is considered sufficiently granular.

In the example of FIG. 6C, the flowchart 600 continues to module 622 with generating DNS records with telemetry data.

In the example of FIG. 6C, the flowchart 600 continues to module 624 with performing a dynamic DNS update to push telemetry data to a network device configuration propagation service. In a specific implementation, the network device configuration propagation service decodes the DNS records and stores the telemetry data that was encoded therein. The flowchart 600 then returns to module 620 and continues as described previously, thereby creating a loop that includes modules 620, 622, and 624.

Figure 7:
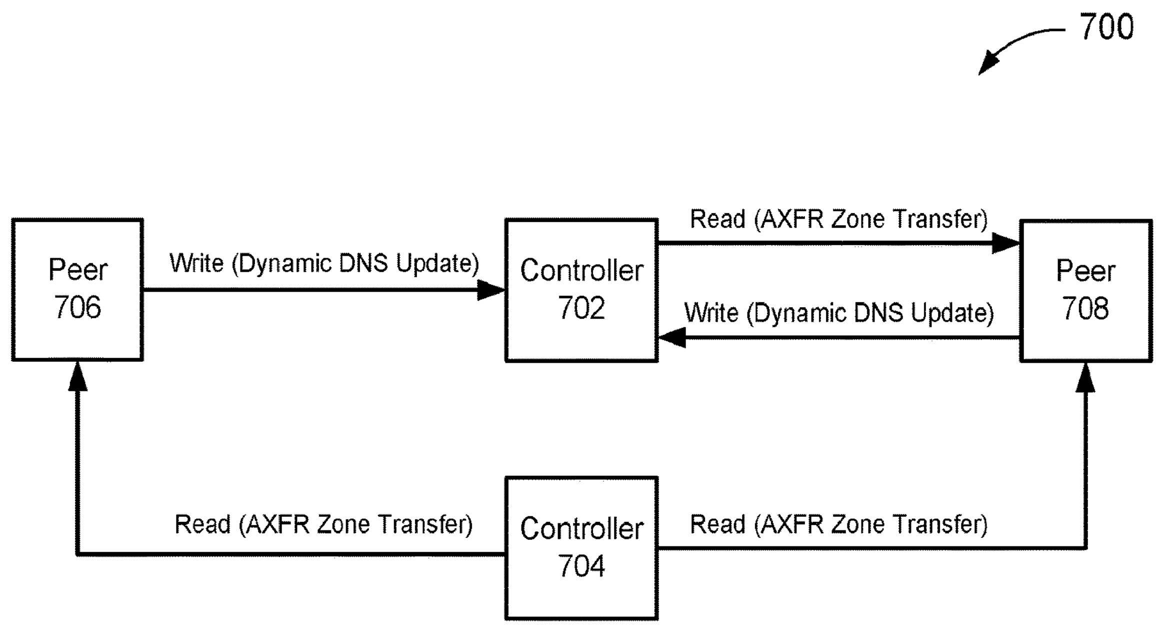
FIG. 7 depicts a diagram of an example of a network device configuration propagation system with multiple propagation controllers.

FIG. 7 depicts a diagram 700 of an example of a network device configuration propagation system with multiple propagation controllers. The diagram 700 includes a controller 702, a controller 704, a peer 706, and a peer 708. The controllers 702, 704 include one or more DNS servers and a DNS zone repository. (Not shown, but see FIGS. 1-6 for a discussion of these components.) The peers 706, 708 include a DNS engine, such as a DNS server or a DNS client. (Not shown, but see FIGS. 1-6 for a discussion of these components.) The peers may or may not be configured in unrelated DNS domains. The diagram 700 is intended to illustrate that a network device configuration propagation service can be controlled by more than one controller.

In the example of FIG. 7, the controllers 702, 704 are intended to represent DNS zone repositories and related engines suitable for propagating network device configurations to a plurality of peers. In the example of FIG. 7, the controller 702 participates in write accesses from the peers 706, 708 and a read access with the peer 708, while the controller 704 participates in a read access with peers 706, 708. These accesses are for illustrative purposes only; the controller 704 need not be characterized as being restricted only to read access from peers. However, it is also possible to limit the allowed form of access. For example, the peer 706 may only be able to make write access to the controller 702 and read access to the controller 704, while the peer 708 can only read from controller 704, but can read from and write to controller 702.

Advantageously, the peers 706, 708 can exchange response policy records (DNS RPZ records) through shared access to a DNS service of the controllers 702, 704, thus not requiring a centralized system to distribute the information.

Figure 8:
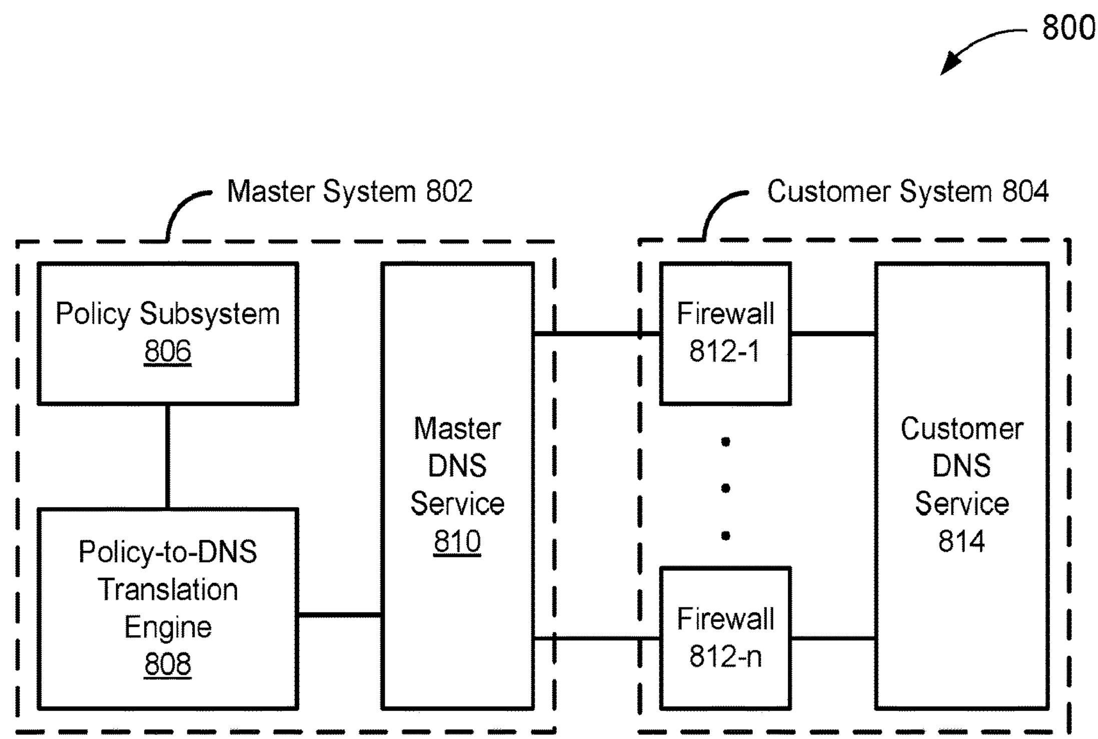
FIG. 8 depicts a diagram of an example of a policy propagation system used by a customer with firewalls.

FIG. 8 depicts a diagram 800 of an example of a policy propagation system used by a customer with firewalls. The diagram 800 includes a master system 802 and a customer system 804. In the example of FIG. 8, the master system 802 is intended to represent a service (or controller) that propagates, in this specific example, policy.

In the diagram 800, the master system 802 includes a policy subsystem 806, a policy-to-DNS translation engine 808, and a master DNS service 810. In the example of FIG. 8, the policy subsystem 806 is intended to represent engines and datastores that generate a network filtering policy (such as a list of domain names and IP networks that can be filtered by a network firewall). The policy-to-DNS translation engine 808 translates the policy to DNS records, such as DNS RPZ records, text records, encoded string data records, to name a few, which need not be limited to DNS record types. The DNS records are loaded into a DNS zone served by the master DNS service 810.

In the diagram 800, the customer system 804 includes a firewall 812-1 to a firewall **812-*n* (collectively, the firewalls 812) and a customer DNS service 814. The firewalls 812 are associated with respective network nodes. In a specific implementation, the firewalls make DNS requests. For example, the firewalls 812 can issue DNS zone transfer requests to the master DNS service 810 to retrieve one or multiple DNS zones containing a network filtering policy and apply the network policy to the network traffic passing through the firewalls 812. The firewalls issue dynamic DNS updates to the customer DNS service 814. For example, the firewalls 812 can send DNS records representing domain names or IP subnets, so as to augment or modify the network filtering policy. Other ones of the firewalls 812 can retrieve these DNS records and apply them to their policy. Advantageously, the system described with reference to FIG. 8 can be applied across multiple controllers with multiple peers, as described with reference to FIG. 7, and with a network configuration system, as described with reference to FIGS. 1-6**.

It should be noted a single entity could control multiple controllers. For example, regulations may require that a service block for different authorities. In this example, the service can be implemented with multiple controllers, each of which is associated with a different authority. Different entities may also control multiple different controllers. For example, a first entity could use a first controller for network device configuration propagation, a second entity could use a second controller for telemetry, and a third entity could use a third controller for ad site policy. Advantageously, different parties can work together, sharing only that which is acceptable to the various entities involved. For example, a private entity may not want to let black or white lists of theirs to be made public.

Figure 9:
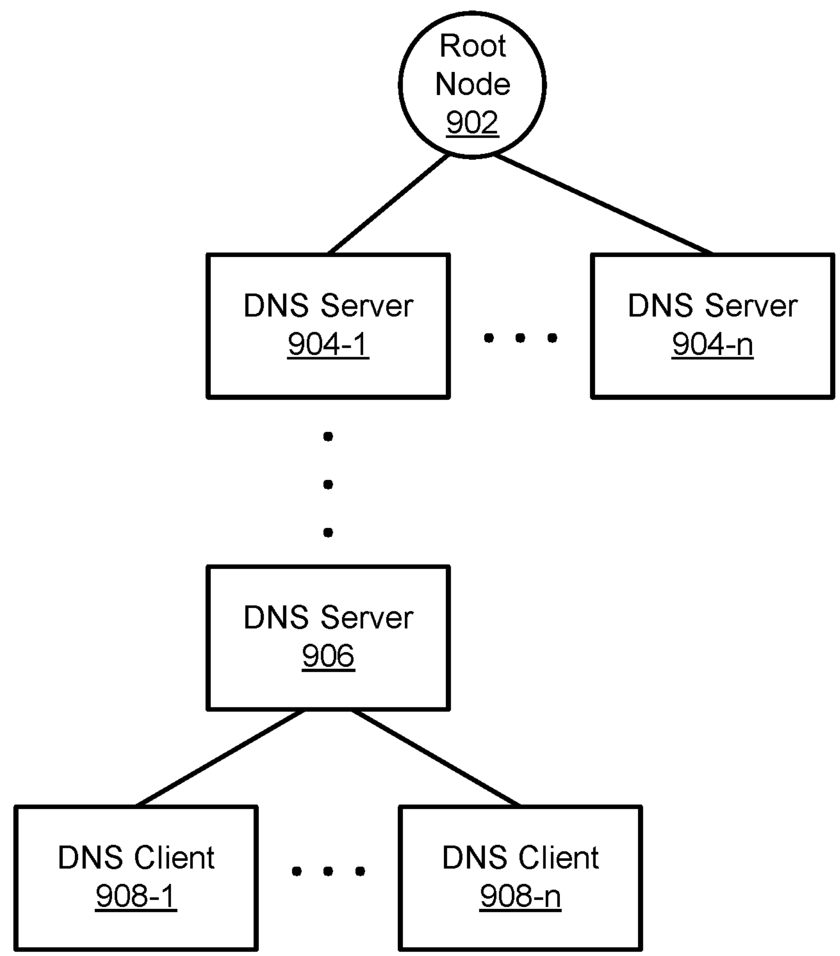
FIG. 9 depicts a diagram of an example of a structure through which propagation, as described in this paper, can occur.

FIG. 9 depicts a diagram 900 of an example of a structure through which propagation, as described in this paper, can occur. The diagram 900 includes a root node 902, DNS server 904-1 to DNS server **904-*n* (collectively, the DNS servers 904), DNS server 906, and DNS client 908-1 to DNS client 908-*n* (collectively, the DNS clients 908). The root node 902 is intended to represent the root node data of DNS zones. The root node data can be replicated across many servers (not shown). The DNS servers 904 are servers that serve root node data to other DNS servers or clients. There can be theoretically any number of servers between the DNS servers 904 and the DNS server 906, which is intended to represent an edge server, with only the DNS clients 908 as children. The DNS server 906** can be implemented with a time-to-live date code cache.

Advantageously, a propagation service can provide a path to an ALT root (rootid), which is a completely distinct tree that lives on a master system or controller. Although TSIG was not designed for access control, in a specific implementation, the master system or controller uses TSIG for both access control and for authentication of data (the latter being what TSIG was designed for).

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

The invention claimed is:

1. A method comprising:

logging into a network device propagation service portal;

entering network device configuration settings;

obtaining a network device configuration propagation agent and a key, the key being derived from a domain name service (DNS) zone name, the DNS zone name being derived from a customer's internet protocol (IP) address;

installing the network device configuration propagation agent on a peer in response to a triggering stimulus from the peer;

installing the key in the network device configuration propagation agent, the key providing the DNS zone name and secure communication with the network device configuration propagation agent.

2. The method of claim 1, comprising:

downloading DNS records with network device configuration data;

storing network device configuration;

checking for network device configuration changes.

3. The method of claim 2, comprising, when a network device configuration change is detected:

downloading, in response to the network device configuration change being detected, DNS records with network device configuration data;

storing the network device configuration data;

checking for network device configuration changes.

4. The method of claim 2, comprising, when a network device configuration change has not been detected, continuing to check for network device configuration changes.

5. The method of claim 2, comprising:

collecting, at a plurality of pre-determined periodic intervals, telemetry data;

generating DNS records with the telemetry data;

performing a dynamic DNS update to push at least some of the telemetry data to a network device configuration propagation service.

6. The method of claim 3, comprising:

collecting, at a plurality of pre-determined periodic intervals, telemetry data;

generating DNS records with the telemetry data;

performing a dynamic DNS update to push at least some of the telemetry data to a network device configuration propagation service.

7. The method of claim 4, comprising:

collecting, at a plurality of pre-determined periodic intervals, telemetry data;

generating DNS records with the telemetry data;

performing a dynamic DNS update to push at least some of the telemetry data to a network device configuration propagation service.

8. The method of claim 1, comprising:

collecting, at a plurality of pre-determined periodic intervals, telemetry data;

generating DNS records with the telemetry data;

performing a dynamic DNS update to push at least some of the telemetry data to a network device configuration propagation service.

9. A system comprising:

one or more processors; and memory storing instructions that, when executed by the one or more processors, cause the system to perform:

logging into a network device propagation service portal;

entering network device configuration settings;

obtaining a network device configuration propagation agent and a key, the key being derived from a domain name service (DNS) zone name, the DNS zone name being derived from a customer's internee protocol (IP) address;

installing the network device configuration propagation agent on a peer in response to a triggering stimulus from the peer;

installing the key in the network device configuration propagation agent, the key providing the DNS zone name and secure communication with the network device configuration propagation agent.

10. The system of claim 9, wherein the instructions, when executed by the one or more processors, cause the system to perform:

downloading DNS records with network device configuration data;

storing network device configuration;

checking for network device configuration changes.

11. The system of claim 10, wherein the instructions, when executed by the one or more processors, cause the system to perform:

downloading, in response to a network device configuration change being detected, DNS records with network device configuration data when the network device configuration change is detected;

storing the network device configuration data when the network device configuration change is detected;

checking for network device configuration changes when the network device configuration change is detected.

12. The system of claim 10, wherein the instructions, when executed by the one or more processors, cause the system to perform continuing to check for network device configuration changes when a network device configuration change has not been detected.

13. The system of claim 10, wherein the instructions, when executed by the one or more processors, cause the system to perform:

collecting, at a plurality of pre-determined periodic intervals, telemetry data;

generating DNS records with the telemetry data;

performing a dynamic DNS update to push at least some of the telemetry data to a network device configuration propagation service.

14. The system of claim 11, wherein the instructions, when executed by the one or more processors, cause the system to perform:

collecting, at a plurality of pre-determined periodic intervals, telemetry data;

generating DNS records with the telemetry data;

performing a dynamic DNS update to push at least some of the telemetry data to a network device configuration propagation service.

15. The system of claim 12, wherein the instructions, when executed by the one or more processors, cause the system to perform:

collecting, at a plurality of pre-determined periodic intervals, telemetry data;

generating DNS records with the telemetry data;

performing a dynamic DNS update to push at least some of the telemetry data to a network device configuration propagation service.

16. The system of claim 9, wherein the instructions, when executed by the one or more processors, cause the system to perform:

collecting, at a plurality of pre-determined periodic intervals, telemetry data;

generating DNS records with the telemetry data;

performing a dynamic DNS update to push at least some of the telemetry data to a network device configuration propagation service.

17. A non-transitory computer readable medium comprising instructions which, when executed, cause one or more processors to perform:

logging into a network device propagation service portal;

entering network device configuration settings;

obtaining a network device configuration propagation agent and a key, the key being derived from a domain name service (DNS) zone name, the DNS zone name being derived from a customer's internet protocol (IP) address;

installing the network device configuration propagation agent on a peer in response to a triggering stimulus from the peer;

installing the key in the network device configuration propagation agent, the key providing the DNS zone name and secure communication with the network device configuration propagation agent.

18. The non-transitory computer readable medium of claim 17, the instructions causing the one or more processors to perform:

downloading DNS records with network device configuration data;

storing network device configuration;

checking for network device configuration changes.

19. The non-transitory computer readable medium of claim 17, the instructions causing the one or more processors to perform:

downloading DNS records with network device configuration data when a network device configuration change is detected;

storing network device configuration when the network device configuration change is detected;

checking for network device configuration changes when the network device configuration change is detected.

20. The non-transitory computer readable medium of claim 17, the instructions causing the one or more processors to perform continuing to check for network device configuration changes when a network device configuration change has not been detected.

* * * * *